United States Patent [19]

Swinbanks et al.

[11] Patent Number: 4,625,449
[45] Date of Patent: Dec. 2, 1986

[54] KNOTLESS PATERNOSTER BOOM

[75] Inventors: Duncan J. Swinbanks; Brian J. Swinbanks, both of Isle of Mull, Scotland

[73] Assignee: Knotless Fishing Tackle Limited, Isle of Mull, Scotland

[21] Appl. No.: 714,277

[22] Filed: Mar. 21, 1985

[30] Foreign Application Priority Data

Mar. 22, 1984 [GB] United Kingdom ............... 8407445

[51] Int. Cl.$^4$ .................................................. A01K 91/04
[52] U.S. Cl. ................................... 43/42.74; 43/43.1; 43/44.85
[58] Field of Search .................. 43/42.74, 43.1, 43.15, 43/44.83, 44.84, 44.85, 44.9, 44.91, 44.92

[56] References Cited

U.S. PATENT DOCUMENTS

| | | | |
|---|---|---|---|
| 473,503 | 4/1892 | Herring, Jr. | 43/44.85 |
| 774,429 | 11/1904 | Hurlbut | 43/43.1 |
| 1,438,264 | 12/1922 | Rygh | 43/44.83 X |
| 2,727,331 | 12/1955 | Feinberg | 43/44.84 |
| 2,893,159 | 7/1959 | Baird | 43/44.85 |
| 3,057,109 | 10/1962 | Houk | 43/44.85 |
| 3,068,605 | 12/1962 | Munsinger | 43/42.74 |
| 3,226,876 | 1/1966 | Luketa | 43/43.1 |

FOREIGN PATENT DOCUMENTS 4232 of 1906 United Kingdom .

Primary Examiner—Nicholas P. Godici
Assistant Examiner—Carmine Cuda
Attorney, Agent, or Firm—Leydig, Voit & Mayer

[57] ABSTRACT

A knotless pasternoster boom 2 for use in holding out a snood 3 from a fishing line 1 comprises a body 6 having an upper end 7 and a lower end 8 and a laterally extending boom member 9 adapted for supporting the snood 3 on the boom member 9 to extend generally axially thereof. The boom 2 has bores 11, 12 extending from respective inlets 13, 14 at the upper and lower ends 7, 8 to an outlet 15 and a prong member 23 associated with the outlet 15. In use of the boom upper and lower loops 26 are taken in the line 1 and fed into the bores 7, 8, through the inlets 13, 14, out of the outlet 15 and around the prong member 23, and the line 1 then pulled taut around the boom 2 thereby to secure the boom 2 in a desired position along the line 1.

7 Claims, 9 Drawing Figures

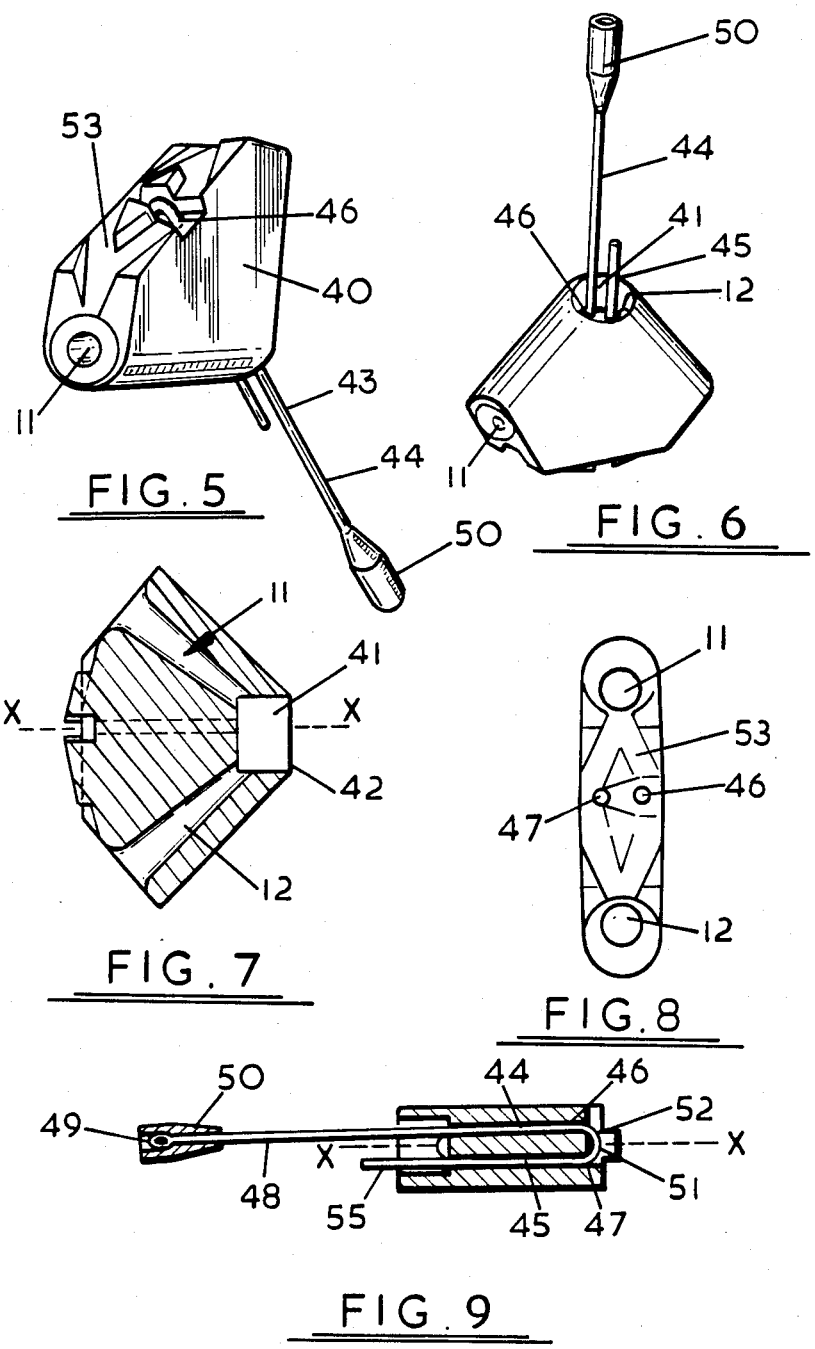

KNOTLESS PATERNOSTER BOOM

The present invention relates to fishing tackle and in particular to paternoster booms.

In certain types of fishing there is used a plurality of short lines with hooks at their free ends and generally referred to as snoods, which are fastened at intervals along a common supporting line.

The snoods are fastened with the aid of so-called paternoster booms which hold them out away from the supporting line so as to reduce the possibility of them interfering with the supporting line or with each other. Since there is normally used a plurality of snoods and it is important that the spaced apart disposition thereof should be maintained, the attachment of the snoods conventional knotting techniques can be a relatively tedious and time consuming process. Moreover it is subsequently very difficult to remove the snoods from the supporting line so that if it is desired to change the snoods or remove them, this is normally efected by cutting them off which is an obstacle to their reuse and involves loss of useful line.

It is an object of the present invention to avoid or minimise one or more of the above disadvantages.

The present invention provides a knotless paternoster boom for use in holding out a snood from a fishing line which boom comprises a body having an upper end and a lower end and a laterally extending boom member adapted for supporting, in use, a snood extending from said boom member generally in the direction in which said boom member extends, said boom having bore means extending from respective inlets at said upper and lower ends to an outlet means and prong means associated with said outlet means whereby in use of the boom upper and lower loops may be taken in a line and fed into the bore means, through respective ones of said inlets, out of said outlet means and around said prong means, and the line then pulled taut around said boom thereby to secure said boom in a desired position along said line. Desirably the body is formed and arranged at said outlet means, but especially at said inlets and prong means so as to provide pathways for the line between said loops and at the ends of said loops which are sub-' stantially free of sharp edges and abrupt discontinuities whereby tightening of the line on the boom is facilitated and the risk of damage to the line when it is pulled taut is minimised.

With a paternoster boom of the present position it is readily possible to fasten a boom and snood secured thereto at any desired position in a quick and simple manner without the need for tying any knots. Moreover by using retractable prong means it is also possible to readily remove the boom when desired.

Naturally the present invention extends to a paternoster boom of the invention when fastened knotlessly to a fishing line.

Further preferred features and advantages of the present invention will appear from the following detailed description given by way of example of a preferred embodiment illustrated with reference to the accompanying drawings in which:

FIG. 5 is a rear perspective view of a second paternoster boom on its own,

FIG. 6 is a front perspective view of the boom of FIG. 5;

FIG. 7 is a sectional elevation in a central plane of the boom of FIG. 5;

FIG. 8 is a rear elevation of the boom of FIG. 5; and

FIG. 9 is a transverse cross-section through the boom of FIG. 5 with a snood support member mounted thereon.

Figure 1:
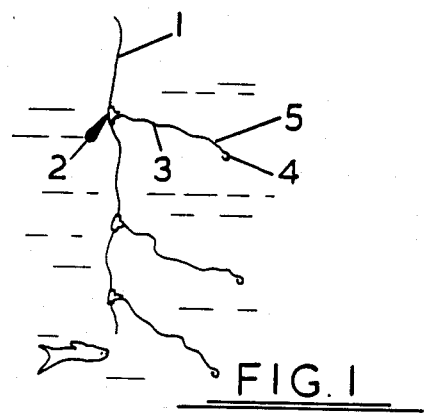
FIG. 1 is a general view of a plurality of paternoster booms of the invention in use.

FIG. 1 shows a fishing line 1 having a plurality of paternoster booms 2 fastened thereto in spaced apart disposition and each having a respective snood 3 secured thereto said snood having a respective hook 4 at the free end 5.

Figure 2:
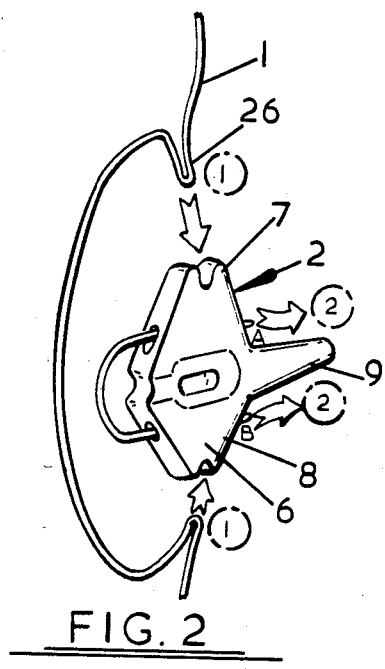
FIGS. 2 and 3 show successive stages in the fastening of one of the booms of FIG. 1 to the line.
Figure 3:
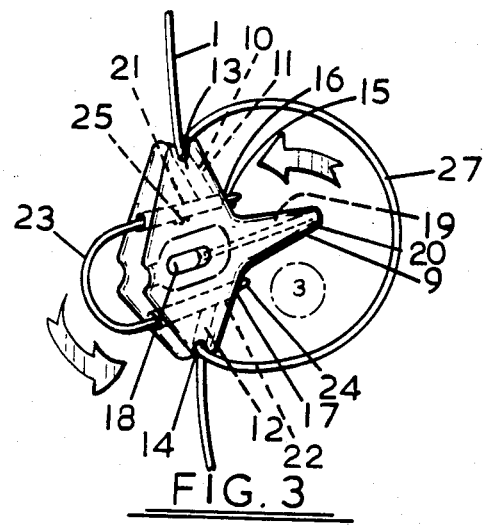
Figure 4:
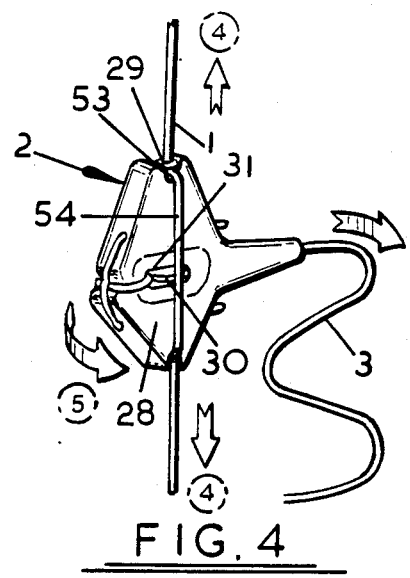
FIG. 4 is a perspective view of the boom of FIGS. 2 and 3 in its fully fastened condition ready for use.

As may be seen in FIG. 2 the boom 2 comprises a generally lozenge-shaped body 6 with an upper end 7, a lower end 8, and a laterally extending boom member 9. As shown in FIG. 3 the body has bore means 10 comprising upper and lower bores 11, 12 extending from respective inlets 13, 14 at the upper and lower ends 7, 8 of the body, to outlet means 15 in the form of respective openings 16, 17 to either side of the boom member 9.

The body 6 also has further passages therein comprising a transverse aperture 18 through a central part of the body 6, a snood receiving passage 19 extending longitudinally along the interior of the boom member 9 from said aperture 18 to the distal end 20 of the boom member 9, and two prong support passages 21, 22 extending generally parallel to the snood receiving passage 19 on opposite sides of the central aperture 18, and converging with respective ones of the upper and lower bores 11, 12 immediately before their outlet ends 16, 17.

A generally U-shaped prong member 23 is releasably retained in position with its limbs 24 extending through and projecting slightly from the outlet ends 16, 17 of the prong support passages 21, 22 with the aid of suitable formations on the prong limbs and/or the prong support passages e.g. coengaging projection and recess means 25.

In use of the paternoster boom two small loops 26 are taken in the line above and below the boom 2 and threaded through the respective bores 11, 12 and out of their outlets 16, 17 whereupon they are hooked over the prong means constituted by the projecting ends of the limbs 24 of the prong member 23. The boom 2 is then rotated three times or thereabouts about its vertical axis (corresponding to the main longitudinal axis of the line above and below it), inside the larger loop 27 formed between the small loops 26 and the line 13 then pulled taut on the boom 2 so that the larger loop 27 is shortened until it extends directly across one side face 28 of the boom 2 between the upper and lower ends 7, 8. The boom 2 is then held substantially fast on the line 1 with the aid of the friction between the larger loop ends 29 wrapped around the line 1 adjacent the bore inlets 13, 14 and the non-rectilinear path of the line inter alia around the prong means.

In order to reduce the possibility of damage or breakage of the line the inlets of the bores are chamfered and rounded as far as possible to avoid any sharp edges or discontinuities along the pathway of the line in and around the boom.

It will be appreciated that various modifications may be made in the above described boom without departing from the scope of the present invention. Thus for example instead of securing the boom in position along the line with the aid of the large loop portions wrapped around the line, the shorter loops could be twisted two or three times prior to hooking over the prong means to provide a suitable degree of line-to-line frictional interengagement whereupon the larger loop no longer requires to be wrapped around the line either side of the boom. Also the bores could be formed and arranged so as to have a common outlet and/or have a common outlet with the snood support passage.

It will also be appreciated that by withdrawing the retractable prong 23 the small loops 26 are released so that they can be withdrawn from the bores 11, 12 thereby releasing the boom 2 from the line 1 in a quick and simple manner. If this facility is not required though then there could be used fixed prong means e.g. in the form of suitable projections in the vicinity of the bore outlet(s). Naturally in this case there would not be any need for any prong support passages and the boom could be made in just a single piece thereby facilitating manufacture and handling thereof.

Any convenient form of fastening means may be used for securing the snood to the boom member. In the case of the embodiment illustrated one end 30 is simply fed through the snood receiving passage 19, out of the central aperture 18 and back around the body to the rear of the aperture 18 whereupon a suitable knot 31 may be tied.

The present invention also extends to a method of fastening a paternoster boom of the invention to a line comprising the steps of threading loops of the line through respective ones of the upper and lower end bores and around the prongs: manipulating, preferably simply twisting, the line and/or boom so as to provide an extended line-to-line frictional engagement contact; and pulling the line taut about the boom. In FIGS. 5 to 9 like reference numerals are used to indicate like parts corresponding to those in the earlier figures.

The paternoster boom of FIGS. 5 to 9 has a generally lozenge-shaped body 40 with respective upper and lower bores 11, 12 similar to the boom of FIGS. 1 to 4. In this case though the bores 11, 12 exit into a cylindrical recess 41 at the front end 42 of the body 40 and the body does not have an integrally formed boom member. Also there is no central aperture in the body and the prong member 43 which is generally 'J'—shaped has its two parallel limb portions 44, 45 mounted in respective parallel prong support passages 46, 47 extending either side of the centre line x—x of the body 40 (see FIGS. 5 and 9).

The longer limb portion 44 has a relatively large length relative to the size of the boom so that it projects a substantial distance outwardly of the boom body and constitutes a separately formed boom member at whose free end 48 is provided a snood line support in the form of a tying-on ring 49 ensheathed in a tubular retractable knot guard 50 which is a push-fit thereonto.

For the purposes of assembly of the boom the prong means is formed initially as a straight member and one end remote from the snood line support end and knot guard thereon is threaded through one prong support passage 46. The straight member is pushed through until a length corresponding to at least twice the length of the required shorter limb portion 45 projects and the free end portion is bent back upon itself. The newly formed shorter limb portion 45 is then aligned with its respective support passage 47 and the whole prong means pulled back threading the shorter limb portion 45 into said passage 47 until the cranked return portion 51 of the prong means engages the rear 52 of the body 40.

By suitable selection of the degree of bending of the prong means and the relative dimensions of the limb portions and support passages, the former engage the sides of the latter resiliently so as to resist unintentional withdrawal therefrom.

As may be seen in FIGS. 5 and 8 in particular the rear 52 of the body 40 is grooved 53 so as to retain an intermediate section 54 (see FIG. 4) of the line 1 which extends between the two inlets of bores 11, 12 against lateral disposition and hence possible loosening after the line has been pulled tight around the boom. Fastening of the boom on the line may be carried out by either of the two methods described for the embodiment of FIGS. 1 to 4 except that in this case the line loops 26 are initially both wound around the projecting end 55 of the shorter limb portion 45 of the prong means.

What is claimed is:

1. A knotless paternoster boom for use in holding out a snood from a fishing line which boom comprises a body having an upper and a lower end and a laterally extending boom member adapted for supporting, in use, a snood extending from said boom member generally in the direction in which said boom member extends said boom having upper bore means extending from an inlet at said upper end to an outlet means remote from said inlet thereof and a lower bore means extending from an inlet at said lower end to an outlet means remote from said inlet thereof and prong means associated with said outlet means whereby in use of the boom upper and lower loops may be taken in a line and fed into the bore means, through the upper and lower boom inlets, respectively out of said outlet means and around said prong means, and the line then pulled taut around said boom thereby to secure said boom in a desired position along said line; said body being formed and arranged at said outlet means, and at said inlets and prong means so as to provide pathways for the line between said loops and at the ends of said loops which are substantially free of sharp edges and abrupt discontinuities whereby tightening of the line on the boom is facilitated and the risk of damage to the line when it is pulled taut is minimized;

said bore means comprising two passage means formed and arranged so as to define guided pathways, without any abrupt discontinuities, extending generally directly from said inlets to said outlet means, for said line loops, said outlets being disposed at the front of said boom substantially adjacent the boom member, whereby in use of the boom a loop of line can be simply pushed into each inlet and will upon further pushing automatically emerge out of said outlet means without the need for any manipulation thereof;

said body being provided with two generally parallel prong support bores; and said prong means being formed separately from said body and being in the form of a prong member having a shape selected from generally 'U'-shaped and generally 'J'-shaped, and being mounted with its two generally parallel limbs disposed in respective ones of said prong support bores in said body wherein said prong member limbs and prong support bores are formed and arranged so that said prong member is slidable between an operating position in which the distal ends of said prong member limbs project from said prong support bores for engagement with a respective line loop in use of the boom, and a retracted position in which said prong member limb distal ends are retracted into said prong support bores for disengagement from said line loops.

2. A boom according to claim 1 wherein said prong member limbs and prong support bores are provided with coengaging projection and recess means formed and arranged for coengagement in said operating position of the prong member so as to retain releasably said prong member in said operating position.

3. A boom according to claim 1 wherein the body is provided with groove means extending from said inlets for retaining against lateral displacement respective portions of an intermediate line section extending between said inlets.

4. A knotless paternoster boom for use in holding out a snood from a fishing line which boom comprises a body having an upper end and a lower end and a laterally extending boom member adapted for supporting, in use, a snood extending from said boom member generally in the direction in which said boom member extends said boom having upper bore means extending from an inlet at said upper end to an outlet means remote from said inlet thereof and a lower bore means extending from an inlet at said lower end to an outlet means remote from said inlet thereof and prong means associated with said outlet means whereby in use of the boom the upper and lower loops may be taken in a line and fed into the bore means, through the upper and lower boom end inlets, respectively, out of said outlet means and around said prong means, and the line then pulled taut around said boom thereby to secure said boom in a desired position along said line; said body being formed and arranged at said outlet means, and at said inlets and prong means so as to provide pathways for the line between said loops and at the ends of said loops which are substantially free of sharp edges and abrupt discontinuities whereby tightening of the line on the boom is facilitated and the risk of damage to the line when it is pulled taut is minimized;

said bore means comprising two passage means formed and arranged so as to define guided pathways, without any abrupt discontinuities, extending generally directly from said inlets to said outlet means, for said line loops whereby in use of the boom a loop of line can be simply pushed into each inlet and will upon further pushing automatically emerge out of said outlet means without the need for any manipulation thereof;

said body being provided with two generally parallel prong support bores; and said prong means being formed separately from said body and being in the form of a generally 'J'-shaped prong member mounted with its two generally parallel limbs disposed in respective ones of said prong support bores in said body; said prong member having a first, substantially extended, limb constituting said boom member of the boom and having a snood line support at its distal end for tying on of a snood line, said snood line support being provided with a retractable elongate knot guard which is slidable between a retracted position in which said snood line support is exposed for tying on of a snood line and an operating position in which it forms a sheath around said support and extends beyond it thereby to resist untying of the snood line and to support it in an outwardly extending disposition from the line on which the boom is mounted in use thereof.

5. A boom according to claim 4 wherein said prong member limbs and prong support bores are formed and arranged so that said prong member is slidable between an operating position in which the distal ends of said prong member limbs project from said prong support bores for engagement with a respective line loop in use of the boom, and a retracted position in which said prong member limb distal ends are retracted into said prong support bores for disengagement from said line loops.

6. A boom according to claim 5 wherein said prong member and prong support passages are formed and arranged so that said prong member resiliently engages said support passages so as to resist withdrawal therefrom.

7. A boom according to claim 6 wherein the body is provided with groove means extending from said inlets for retaining against lateral displacement respective portions of an intermediate line section extending between said inlets.

* * * * *